(12) United States Patent
Hwang et al.

(10) Patent No.: US 8,903,439 B2
(45) Date of Patent: Dec. 2, 2014

(54) APPARATUS AND METHOD FOR COMMUNICATING IN A NETWORK IN WHICH INTERFERENCE EXISTS BETWEEN WIRELESS COMMUNICATION SYSTEMS

(75) Inventors: Sang-Yun Hwang, Suwon-si (KR); Jin-Woo Roh, Suwon-si (KR); Seo-Goo Lee, Aanyang-si (KR)

(73) Assignee: Samsung Electronics Co., Ltd (KR)

( * ) Notice: Subject to any disclaimer, the term of this patent is extended or adjusted under 35 U.S.C. 154(b) by 549 days.

(21) Appl. No.: 13/252,730

(22) Filed: Oct. 4, 2011

(65) Prior Publication Data

US 2012/0083301 A1    Apr. 5, 2012

(30) Foreign Application Priority Data

Oct. 4, 2010 (KR) .................. 10-2010-0096473

(51) Int. Cl.
| | |
|---|---|
| H04W 52/04 | (2009.01) |
| H04W 92/00 | (2009.01) |
| H04B 15/00 | (2006.01) |
| H04W 52/24 | (2009.01) |
| H04W 28/04 | (2009.01) |
| H04W 88/06 | (2009.01) |
| H04W 28/18 | (2009.01) |

(52) U.S. Cl.
CPC .............. *H04W 28/04* (2013.01); *H04W 88/06* (2013.01); *H04W 52/243* (2013.01); *H04W 28/18* (2013.01)
USPC ...... 455/501; 455/127.5; 455/574; 455/343.1

(58) Field of Classification Search
USPC ................... 455/127.5, 574, 343.1
See application file for complete search history.

(56) References Cited

U.S. PATENT DOCUMENTS

| | | | |
|---|---|---|---|
| 7,043,254 B2* | 5/2006 | Chawla et al. ............ 455/456.1 |
| 8,116,688 B2* | 2/2012 | Matsumoto et al. ......... 455/63.1 |
| 8,195,113 B2* | 6/2012 | Kodama ..................... 455/127.5 |
| 8,259,678 B2* | 9/2012 | Jung et al. ..................... 370/331 |
| 2008/0065944 A1* | 3/2008 | Seol et al. .................... 714/748 |
| 2010/0093398 A1* | 4/2010 | Kodama ....................... 455/561 |
| 2010/0150043 A1* | 6/2010 | Kim et al. ..................... 370/311 |
| 2011/0064048 A1* | 3/2011 | Oguchi ......................... 370/331 |

OTHER PUBLICATIONS

Air Interface for Fixed Broadband Wireless Access Systems, Information Technology, Telecommunications and Information Exchange Between Systems—LAN/MAN Specific Requirements, IEEE WirelessMAN 802.16, IEEE 802.16.1-00/01r4, Sep. 2000.

* cited by examiner

*Primary Examiner* — Bobbak Safaipour
(74) *Attorney, Agent, or Firm* — The Farrell Law Firm, P.C.

(57) ABSTRACT

An apparatus and method are provided for communicating in a network in which interference exists between wireless communication systems. The apparatus includes multiple transceivers for individually communicating with base stations of the multiple wireless communication systems; and a controller for negotiating with at least one of the base stations, setting a non-communication period with a negotiated base station, and communicating with the negotiated base station during the non-communication period, based on whether an interference level between wireless signals communicated through the multiple transceivers falls within a predetermined range.

20 Claims, 7 Drawing Sheets

APPARATUS AND METHOD FOR COMMUNICATING IN A NETWORK IN WHICH INTERFERENCE EXISTS BETWEEN WIRELESS COMMUNICATION SYSTEMS

PRIORITY

This application claims priority under 35 U.S.C. §119(a) to Korean Patent Application Serial No. 10-2010-0096473, which was filed in the Korean Intellectual Property Office on Oct. 4, 2010, the entire disclosure of which is hereby incorporated by reference.

BACKGROUND OF THE INVENTION

1. Field of the Invention

The present invention relates generally to an apparatus and method for communicating in a network in which interference exists between wireless communication systems, and more particularly, to a communication apparatus and method for providing a stable communication system by minimizing an impact of interference.

2. Description of the Related Art

Generally, wireless terminals are capable of communicating using multiple communication schemes. For example, a wireless terminal may use Long Term Evolution (LTE) or Wireless Broadband (WiBro) as a communication scheme for data communication in a large area such as a macro cell area, and may use Wireless Fidelity (Wi-Fi) for data communication in a small area such as Personal Area Network (PAN).

To provide more efficient communication services, advanced networks have been designed, in which wireless communication systems with small coverage area coexist within a wireless communication system with large coverage area.

A wireless terminal capable of communicating with wireless communication systems that use different communication schemes may include multiple transceivers supporting the different communication schemes of the wireless communication systems. However, when the wireless terminal receives a wireless signal transmitted from a second wireless communication system, while transmitting a wireless signal to a first wireless communication system, interference between the wireless signals transmitted and received to and from the two wireless communication systems may occur in the wireless terminal.

Due to this interference, the wireless terminal may not receive some important data for network configuration, such as a Super Frame Header (SFH) in Mobile WiMax network or a beacon packet in a ZigBee network.

While various communication schemes for minimizing interference between wireless signals have been proposed, it is still difficult to maintain the stability of the wireless communication systems as a data transfer rate decreases during interference cancellation.

SUMMARY OF THE INVENTION

Accordingly, the present invention has been made to solve at least the above-described problems occurring in the prior art, and to provide at least the following advantages.

An aspect of the present invention is to provide a stable communication system by minimizing an impact of interference and preventing a decrease in a data transfer rate during data transmission and reception by determining an interference level associated with a transmission power of a terminal.

Another aspect of the present invention is to provide a communication apparatus and method that prevent a decrease in a data transfer rate, while performing interference cancellation in a network in which interference exists between multiple wireless communication systems.

In accordance with an aspect of the present invention, an apparatus for communicating with multiple wireless communication systems is provided. The apparatus includes multiple transceivers for individually communicating with base stations of the multiple wireless communication systems; and a controller for negotiating with at least one of the base stations, setting a non-communication period with a negotiated base station, and communicating with the negotiated base station during the non-communication period, based on whether an interference level between wireless signals communicated through the multiple transceivers falls within a predetermined range.

In accordance with another aspect of the present invention, a method is provided for communicating with multiple wireless communication systems in a wireless terminal. The method includes setting, by the wireless terminal, a non-communication period by negotiating with at least one base station among the multiple wireless communication systems; and communicating with a negotiated base station during the non-communication period, depending on whether an interference level between wireless signals communicated between the negotiated base station and the wireless terminal fall within a predetermined range.

In accordance with another aspect of the present invention, an apparatus is provided for communicating with a wireless terminal in each of multiple wireless communication systems. The apparatus includes a transceiver for communicating with the wireless terminal; and a controller for negotiating with the wireless terminal, setting a non-communication period, and performing communication with the wireless terminal during the non-communication period, based on whether power information of a transmission signal is transmitted from the wireless terminal.

In accordance with another aspect of the present invention, a method is provided for communicating with a wireless terminal in each of multiple wireless communication systems. The method includes negotiating with the wireless terminal to set a non-communication period; and communicating with the wireless terminal during the non-communication period, based on whether power information of a transmission signal is transmitted from the wireless terminal.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details, such as detailed configuration and components, are merely provided to assist the overall understanding of certain embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 1:
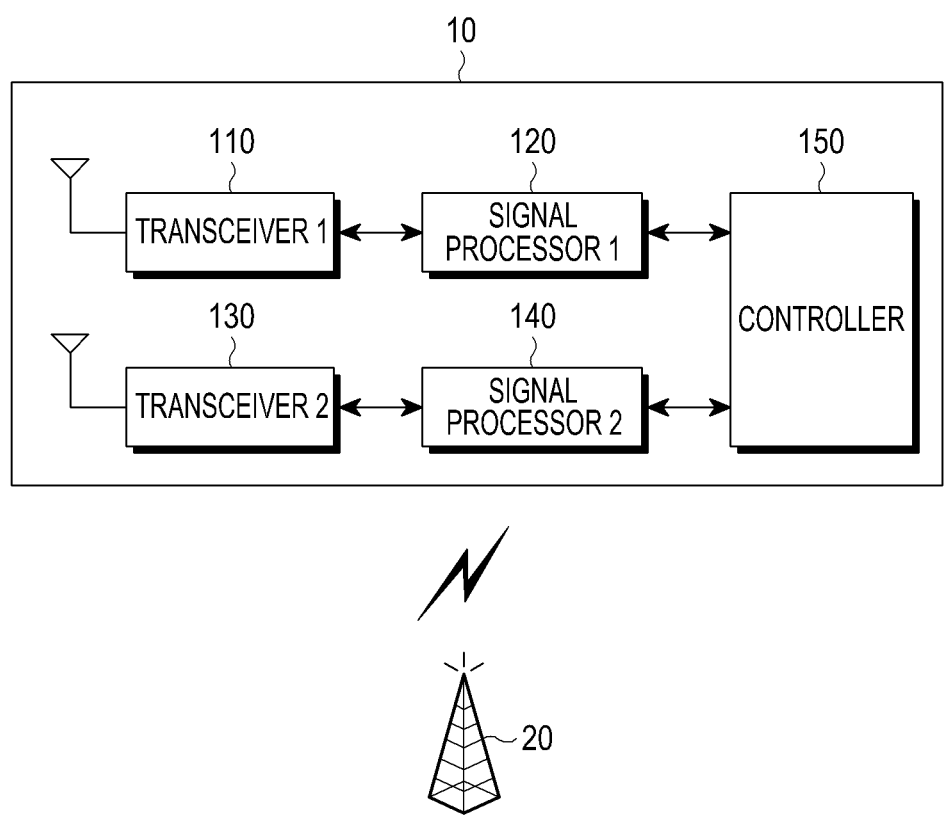
FIG. 1 illustrates a terminal and a base station according to an embodiment of the present invention.

FIG. 1 illustrates a terminal and a base station according to an embodiment of the present invention.

Specifically, in FIG. 1, a terminal 10 includes multiple transceivers capable of individually communicating with multiple wireless communication systems. Further, although only one base station 20 is illustrated in FIG. 1 for convenience of description, multiple base stations corresponding to the multiple wireless communication systems may exist. Additionally, depending on the type of wireless communication systems, these base stations may include various network entities serving as a wireless access point, e.g., a Node B or an Access Point (AP). However, for convenience, these network entities will be referred to herein as base stations.

Referring to FIG. 1, the terminal 10 includes a first transceiver 110, a second transceiver 130, a first signal processor 120, a second signal processor 140, and a controller 150.

Each of the first and second transceivers 110 and 130 transmits or receives a wireless signal to or from its associated wireless communication system using a corresponding communication scheme. For example, each of the first and second transceivers 110 and 130 may include a transceiver unit, a Band-Pass Filter (BPF), and a Power Amplifier (PA).

Further, each of the first and second signal processors 120 and 140 performs signal processing by demodulating and decoding a received signal and providing the decoded data to a user, or by encoding and modulating a transmission signal for transmitting by the first and second transceivers 110 and 130. For example, each of the first and second signal processors 120 and 140 may include a Radio Frequency (RF) unit (not shown) and a modem (not shown). The modem performs various functions such as conversion between digital data and analog data, data encoding/decoding, and data modulation/demodulation, such that during transmission, the modem converts digital data to be transmitted into an analog signal depending on the modulation scheme, and during reception, the modem removes distortions and noises having occurred in the signal transmission process from a received signal using various mathematical and probabilistic techniques, and outputs digital data that can be considered the same data as the transmitted data, if possible. The RF unit converts a baseband signal into an RF signal so that the signal may use its frequency band during transmission/reception.

Although the transceivers 110 and 130 and the signal processors 120 and 140 are illustrated as two separate components in FIG. 1, they may also be embodied as a single transceiver.

The controller 150 determines whether to transmit or receive a signal by determining a level of interference occurring between multiple transceivers. For example, if interference occurs as a transmission signal from a first wireless communication system is received at the second transceiver 130, while a wireless signal is transmitted from the first transceiver 110 to the first wireless communication system, the controller 150 does not perform data transmission or reception in a specific period between the first transceiver 110 and the first wireless communication system in order to minimize the impact of interference. Therefore, in accordance with an embodiment of the present invention, a Co-Located Coexistence (CLC) active interval scheme is used to minimize an impact of interference. Herein, a non-communication period in which data transmission and reception is not performed will be referred to as a CLC period, and the term "interference" may refer to mutual interference.

In accordance with an embodiment of the present invention, the controller 150 may controls the terminal 10 to communicate, even during the CLC period, if an interference level measured in the CLC period is less than a predetermined threshold, i.e., if the interference does not significantly affect data transmission and reception.

Figure 2:
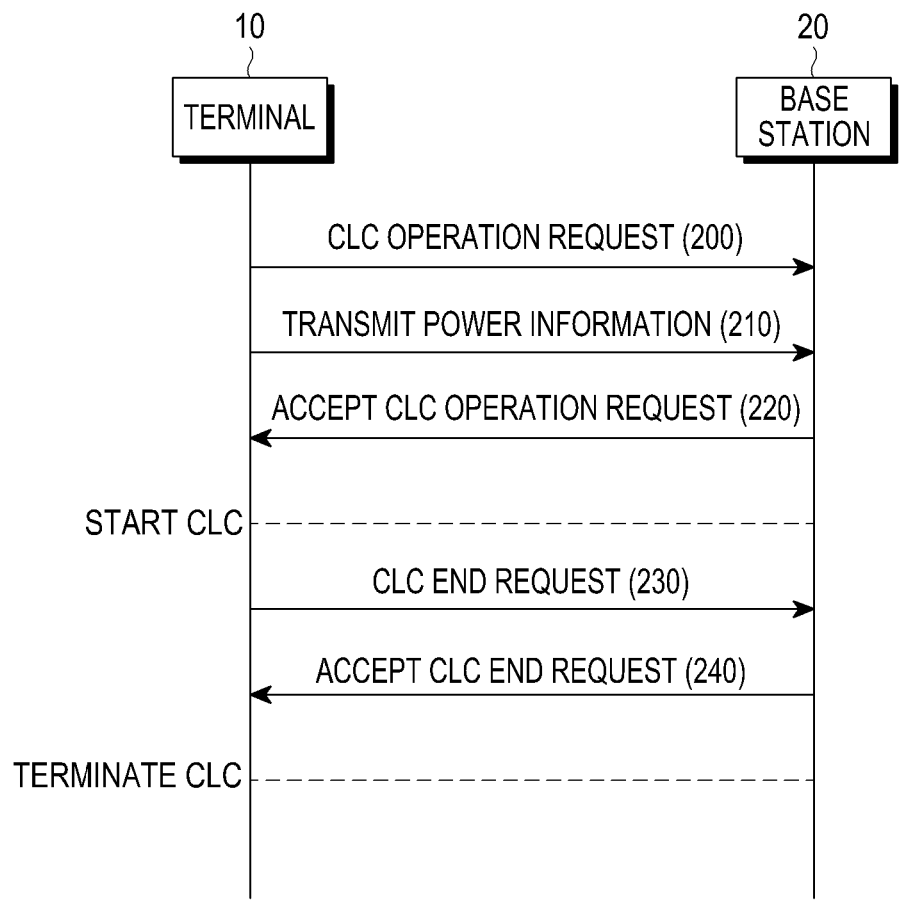
FIG. 2 illustrates a Co-Located Coexistence (CLC) active interval signal flow between a terminal and a base station according to an embodiment of the present invention.

FIG. 2 illustrates a CLC signal flow between a terminal and a base station according to an embodiment of the present invention. Specifically, in FIG. 2, a base station 20 is a base station of a first wireless communication system to which a terminal 10 transmits a wireless signal, and a base station (not shown) of a second wireless communication system from which the terminal 10 receives a wireless signal is a base station different from the base station 20.

Referring to FIG. 2, in step 200, the terminal 10 transmits a CLC operation request to the base station 20 of the first wireless communication system to minimize the interference-related problems. For example, the CLC operation request includes at least one of a CLC start time, a CLC cycle, and a CLC period.

In step 210, the terminal 10 transmits power information of a wireless transmission signal to the base station 20 of the first wireless communication system. Although FIG. 2 illustrates two transmission steps, i.e., 200 and 210, alternatively, the CLC operation request and the power information may be transmitted together in a single step.

For example, the power information includes (i) a transmission power level of a transmission signal from a first transceiver at which a data exchange with the second wireless communication system is not affected (or insignificantly affected), even though interference occurs in the second transceiver due to the transmission signal from the first transceiver; and (ii) a maximum transmission power level of a transmission signal from the first transceiver at which the data exchange is insignificantly affected, even though interference occurs.

As for the transmission power level and the maximum transmission power level, appropriate power levels may be used that are determined by experimentation, or predetermined power levels may be used. When data transmission and reception is insignificantly affected, even though interference occurs in the second transceiver, the terminal 10 and the base station 20 of the first wireless communication system may perform data transmission and reception during the CLC period.

When performing data transmission and reception during the CLC period, the terminal 10 and the base station 20 communicate based on the transmission power level of the transmission signal, included in the power information. That is, the terminal 10 performs data exchange with the first wireless communication system, even during the CLC period, if the transmission power level of the terminal 10 is included in the power information, or if a power level of the transmission signal measured by the first transceiver is less than or equal to the maximum transmission power level at which the data exchange is insignificantly affected. A controller in the base station 20 may determine whether to accept the CLC operation request, and may also determine whether to perform data transmission and reception during the CLC period, based on the transmission power level.

If the base station 20 accepts the CLC operation request in step 220, the terminal 10 does not exchange data with the base station 20 of the first wireless communication system during the CLC period.

The CLC period may be defined as a period in which important data for network configuration is transmitted/received in the second wireless communication system, e.g., a period in which the terminal 10 receives an SFH in a Mobile WiMax scheme or a beacon packet in a ZigBee scheme from the second wireless communication system. Accordingly, even though interference occurs in the second transceiver due to the signal transmitted from the first transceiver, the impact of interference may be minimized when the important data for network configuration is exchanged between the second transceiver and the second wireless communication system.

When terminating the CLC operation, the terminal 10 transmits a CLC end request to the base station 20 in step 230. If the base station 20 accepts the CLC end request in step 240, the CLC operation is terminated.

Figure 3:
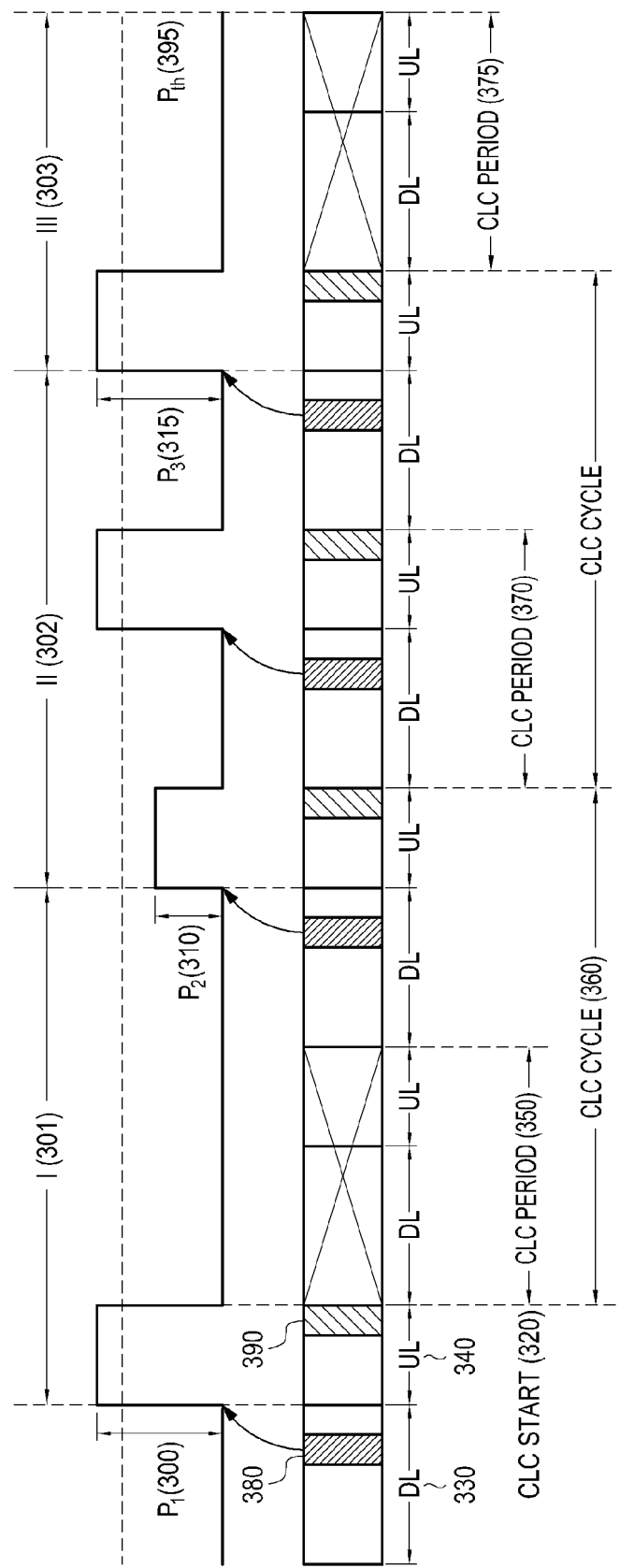
FIG. 3 illustrates a CLC operation according to an embodiment of the present invention.

FIG. 3 illustrates a CLC operation according to an embodiment of the present invention.

Referring to FIG. 3, $P_1$ 300, $P_2$ 310 and $P_3$ 315 are power levels of transmission signals transmitted from the first transceiver of the terminal 10. $P_1$ 300 and $P_3$ 315 represent power levels that are greater than a maximum transmission power level $P_{th}$ 395 (shown by a dotted line), when they are not included in power information of transmission signals or when the data transmission or reception is insignificantly affected in the second transceiver, even though interference occurs in the second transceiver, due to the transmission signal transmitted from the first transmitter. $P_2$ 310 represents a power level of a transmission signal transmitted from the first transceiver, which is included in power information of a transmission signal, or is less than or equal to $P_{th}$ 395. In order to apply hysteresis, $P_{th}$ 395 may be divided into a first $P_{th}$ and a second $P_{th}$. If a power level of the transmission signal transmitted from the first transceiver is greater than the first $P_{th}$ but less than or equal to the second $P_{th}$, it may be considered that the data transmission or reception is insignificantly affected in the second transceiver, even though interference occurs in the second transceiver, due to the transmission signal transmitted from the first transmitter.

The transmission power level of the transmission signal may be determined as the base station 20 predicts a transmission power level of the terminal 10 based on power control information transmitted to the terminal 10 (see 380), or as the terminal 10 directly delivers the power level of the transmission signal presently being transmitted by the first transceiver to the base station 20 over an UpLink (UL) 340 (see 390). The power control information is transmitted over a DownLink (DL) 330 (see 380), when the base station 20 controls transmission power of the terminal 10, and the base station 20 controls the transmission power of the terminal 10 at stated intervals based on the power control information.

In operation, if the base station 20 accepts a request for the CLC operation from the terminal 10, the terminal 10 and the base station 20 start the CLC operation at a CLC cycle 360 (see 320). In a conventional CLC operation, the terminal 10 does not perform data transmission or reception during the CLC period of the CLC cycle, and performs the data transmission and reception in the other period. However, in a CLC operation according to an embodiment of the present invention, the terminal 10 performs data transmission and reception, during the CLC period, if the data transmission or reception is insignificantly affected by any occurring interference. For example, in period 1301 of FIG. 3, because the power level of the transmission signal currently being transmitted from the first transceiver of the terminal 10 is $P_1$ 300, data transmission and reception is not performed between the first transceiver and the base station 20 in a CLC period 350.

In period II 302, because a second CLC period 370 starts after the power level $P_2$ 310, which is less than the maximum transmission power level $P_{th}$ 395, data transmission and reception is performed between the first transceiver and the base station 20 in the second CLC period 370.

In period III 303, because a third CLC period 375 starts after $P_3$ 315, data transmission and reception is not performed in the CLC period 375.

Figure 4:
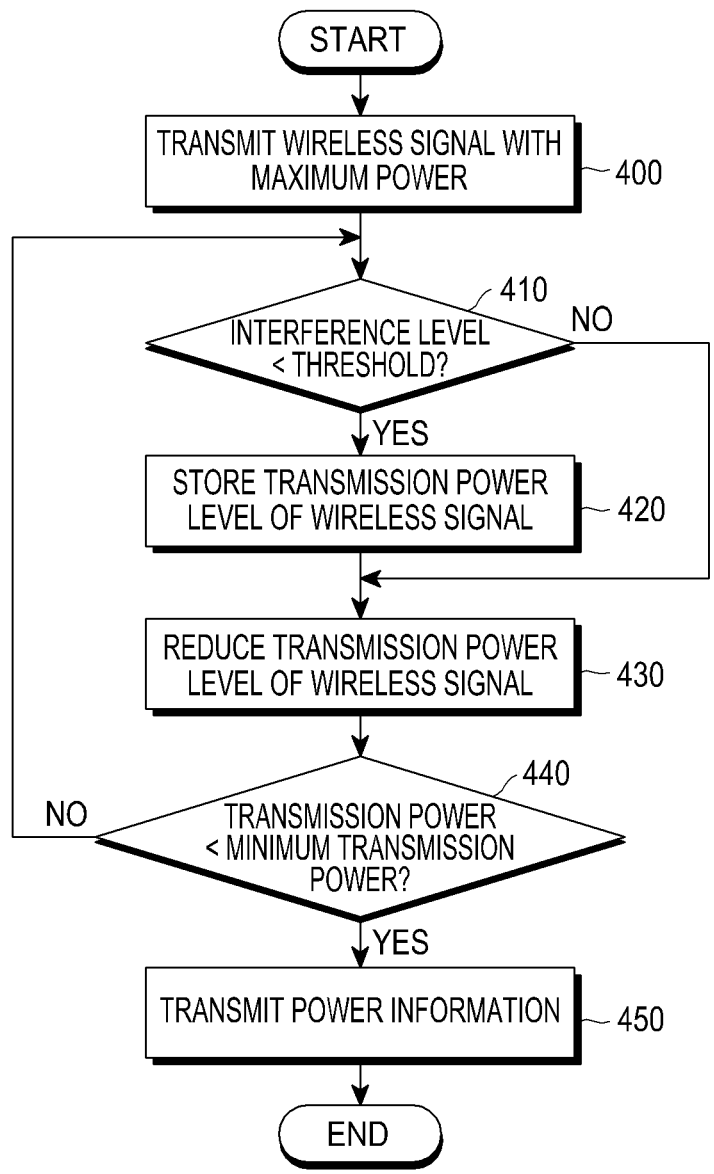
FIG. 4 illustrates a power information generation method in a terminal according to an embodiment of the present invention.

FIG. 4 illustrates a power information generation method in a terminal according to an embodiment of the present invention.

Referring to FIG. 4, the first transceiver transmits a transmission signal to the first wireless communication system with a maximum transmission power in step 400. The controller 150 measures a Received Signal Strength Indication (RSSI) of the transmission signal from the first transceiver, which acts as an interference signal in the second transceiver, and compares the RSSI of the transmission signal with a predetermined threshold in step 410. It should be noted that the RSSI is not a strength of the signal that a base station of the second wireless communication system has transmitted and the second transceiver has received, but is a strength of the signal that the first transceiver in the terminal 10 has transmitted and the second transceiver has received.

The threshold is an interference level at which data transmission and reception is insignificantly affected in the second transceiver, even though interference occurs due to the transmission signal from the first transceiver. For example, the threshold may be determined through experimentation.

If the RSSI of the transmission signal from the first transceiver is less than the threshold (YES in step 410), the controller 150 stores the transmission power level of the transmission signal in step 420. However, if the RSSI of the transmission signal is greater than or equal to the threshold (NO in step 410), operation proceeds to step 430 without storing the transmission power level of the transmission signal in step 420.

In step 430, the controller 150 reduces the transmission power level of the transmission signal, and then compares it with a predetermined minimum transmission power level in step 440.

If the reduced transmission power level of the transmission signal is greater than or equal to the predetermined minimum transmission power (NO in step 440), the operation returns to step 410, repeating steps 410 to 440, until the transmission power level of the transmission signal is less than the minimum transmission power level.

When the transmission power level of the transmission signal is less than the minimum transmission power level (YES in step 440), the controller 150 transmits power information to the base station 20 of the first wireless communication system in step 450. The power information includes the stored transmission power level of the transmission signal, and the maximum transmission power level at which data transmission and reception is insignificantly affected by any interference that occurs.

Figure 5:
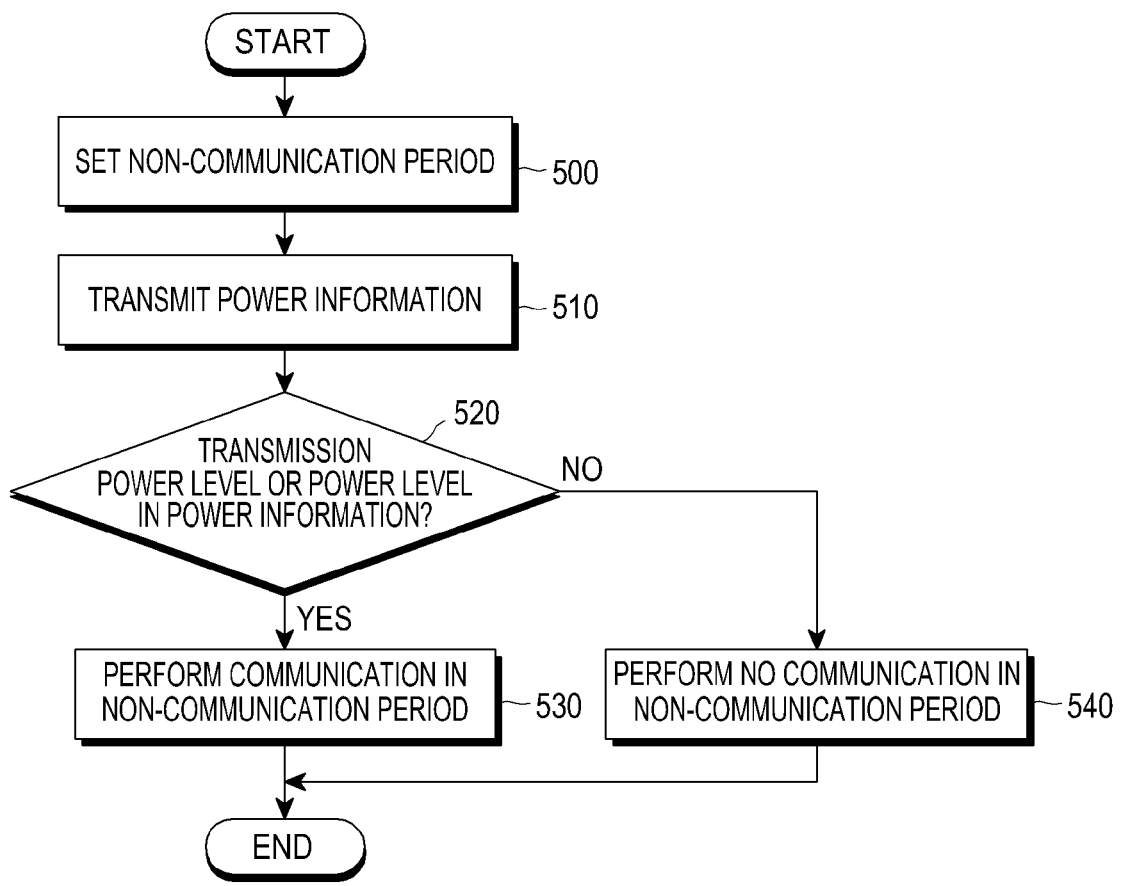
FIG. 5 illustrates operations of a terminal and a base station according to an embodiment of the present invention.

FIG. 5 illustrates operations of a terminal and a base station according to an embodiment of the present invention.

Referring to FIG. 5, in step 500, a terminal 10 sets a CLC period, i.e., a non-communication period, by requesting a CLC operation from the base station 20. In step 510, the terminal transmits power information, as described above, to the base station 20.

If the power level of the transmission signal transmitted from the terminal 10 is not included in the power information, or is greater than a maximum transmission power level at which data transmission and reception is insignificantly affected by interference (NO in step 520), the terminal 10 and the base station 20 do not perform data transmission or reception in the CLC period in step 540. However, if the power level of the transmission signal is included in the power information, or is less than or equal to the maximum transmission power level at which data transmission and reception is insignificantly affected, even though interference occurs (YES in step 520), the terminal 10 and the base station 20 perform data transmission and reception, even during the CLC period, in step 530.

Figure 6:
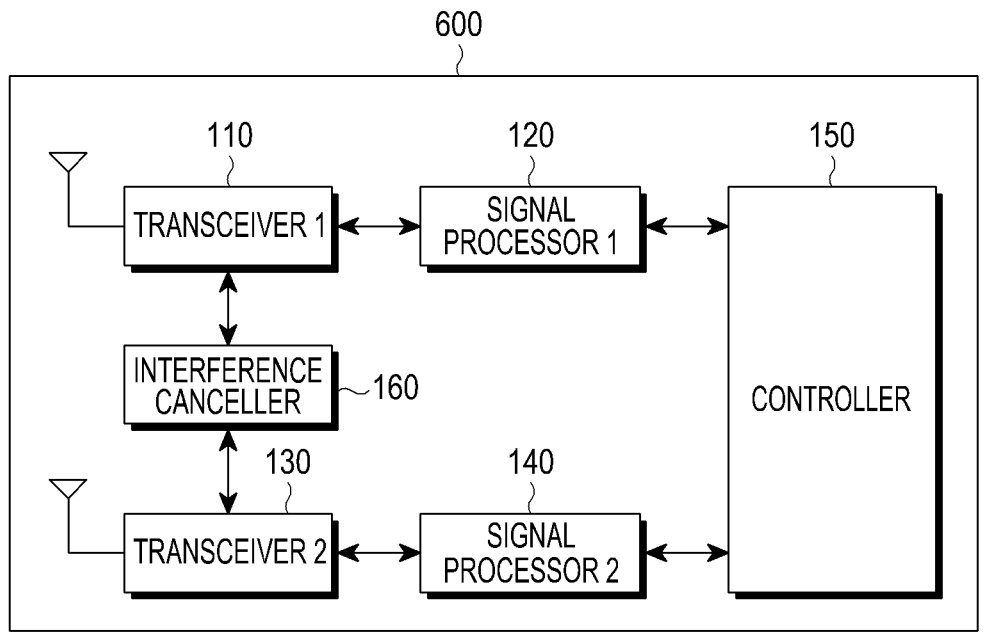
FIG. 6 illustrates a terminal and a base station according to an embodiment of the present invention.

FIG. 6 illustrates a terminal and a base station according to an embodiment of the present invention.

Referring to FIG. 6, a terminal 600 includes a first transceiver 110, a second transceiver 130, a first signal processor 120, a second signal processor 140, an interference canceller 160, and a controller 150. It will be understood by those of ordinary skill in the art that the first and second transceivers 110 and 130, the first and second signal processors 120 and 140, and the controller 150 in the terminal 10 are equal or similar to those described above.

In FIG. 6, the interference canceller 160 is provided to minimize an impact of interference by reducing interference that a transmission signal from the first transceiver 110 generates in the second transceiver 130. For example, the interference canceller 160 may include an attenuator (not shown) and a phase shifter (not shown). The attenuator adjusts an amplitude of a signal, and the phase shifter adjusts a phase of a signal. If the interference canceller 160 adjusts an amplitude and a phase of the transmission signal from the first transceiver 110, the impact of interference caused by the adjusted transmission signal may be reduced. The attenuator and the phase shifter may adjust an amplitude and a phase of a signal in various different ways.

The controller 150 compares an RSSI it has measured based on the transmission signal that the first transceiver has transmitted and the second transceiver has received, with a predetermined threshold. If the RSSI (e.g., an interference level) is greater than the threshold, the controller 150 controls the interference canceller 160 to reduce the interference level. The controller 150 compares the reduced interference level with the threshold, and communicates in the CLC period if the reduced interference level is less than the threshold. In comparing the reduced interference level with the threshold, the attenuator and the phase shifter reduce the interference level, step by step, by applying possible amplitudes and phases. The controller 150 compares the interference level with the threshold each time the amplitude and the phase are adjusted. If the reduced interference level is less than the threshold, the controller 150 stops reducing the interference level, adds the associated transmission power level in the power information, and transmits the power information to the base station 20. However, if the interference level reduced by applying all of the possible amplitudes and phases is still greater than the threshold, the controller 150 considers the power level as a transmission power level at which it does not perform communication in the CLC period.

Figure 7:
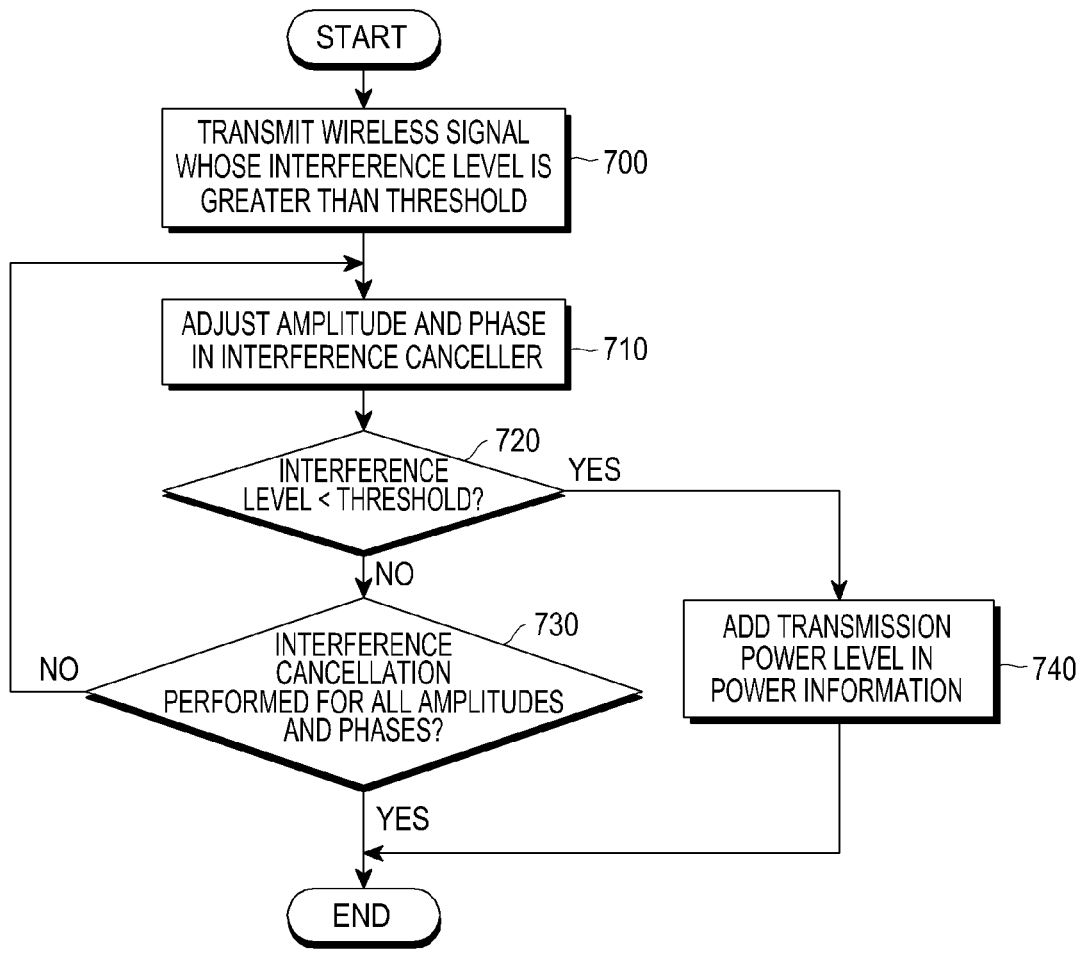
FIG. 7 illustrates an interference cancelling method in a terminal according to an embodiment of the present invention.

FIG. 7 illustrates an interference cancelling operation in a terminal according to an embodiment of the present invention.

Referring to FIG. 7, a first transceiver transmits a transmission signal having an interference level that is greater than a specific threshold in step 700, and the controller 150 controls the interference canceller 160 to adjust an amplitude and a phase of the transmitted transmission signal in step 710. In step 720, the controller 150 compares the reduced interference level with a threshold to determine if the reduced interference level is less than the threshold. If the reduced interference level is less than the threshold (YES in step 720), the controller 150 adds the associated transmission power level in the power information in step 740. However, if the reduced interference level is greater than or equal to the threshold (NO in step 720), in step 730, the controller 150 determines whether it has adjusted an amplitude and a phase for all available amplitudes and phases. If the amplitude and the phase have been adjusted for all available amplitudes and phases (YES in step 730), the controller 150 avoids adding the associated transmission power level in the power information. However, if the amplitude and the phase have not been adjusted for all available amplitudes and phases (NO in step 730), the operation returns to step 710.

As is apparent from the foregoing description, in accordance with embodiments of the present invention, data transmission and reception are not performed in during a specific period, if the data transmission or reception will be significantly affected by interference, making it possible to minimize an impact of the interference.

Additionally, in accordance with embodiments of the present invention, data transmission and reception may be performed even during the specific period (or a CLC period), if the impact of interference is insignificant, making it possible to prevent a decrease in data transfer rate.

Although embodiments of the present invention have been described above, where a terminal communicates with two wireless communication systems, the present invention may also be applied in the same way to any multi-mode terminals capable of communicating with two or more wireless communication systems. In this case, the terminal may negotiate the CLC operation with each wireless communication system.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:
1. A wireless terminal, comprising:
multiple transceivers configured to individually communicate with base stations of multiple wireless communication systems; and
a controller configured to set a non-communication period with a negotiated base station of the base stations, to determine a threshold power level of the wireless terminal to be used for determining whether to communicate in the non-communication period, to transmit information on the threshold power level to the negotiated base station, and to communicate with the negotiated base station during the non-communication period, if a power level of the wireless terminal in a start time of the non-communication period is less than the threshold power level.

2. The wireless terminal of claim 1, wherein the controller is further configured to determine the threshold power level based on an interference level for communication with at least one of the base stations, except for the negotiated base station.

3. The wireless terminal of claim 1, wherein information on the power level of the wireless terminal is transmitted to the negotiated base station.

4. The wireless terminal of claim 1, wherein the non-communication period is periodically repeated according to a non-communication period cycle.

5. The wireless terminal of claim 1, further comprising an interference canceller configured to reduce a level of interference among wireless signals communicated through the multiple transceivers,
wherein the controller is further configured to control the interference canceller to reduce the level of the interference, if the level of the interference is greater than an interference threshold.

6. The wireless terminal of claim 5, wherein the controller is further configured to control the multiple transceivers to communicate with the negotiated base station in the non-communication period, if the reduced level of the interference is less than the interference threshold.

7. The wireless terminal of claim 6, wherein the controller is further configured to control the multiple transceivers to transmit, to the negotiated base station, power information including a power level of at least one associated transmission signal for which a reduced level of interference is less than the interference threshold, among power levels of transmission signals transmitted from the multiple transceivers to the base stations.

8. The wireless terminal of claim 1, wherein the non-communication period includes a period in which data required for network configuration is communicated through another base station other than the negotiated base station of the base stations.

9. The wireless terminal of claim 8, wherein the data required for the network configuration comprises at least one of a super frame header (SFH) and a beacon packet.

10. A method for communicating with multiple wireless communication systems by a wireless terminal, the method comprising:
setting a non-communication period with a negotiated base station among base stations of the multiple wireless communication systems;
determining a threshold power level of the wireless terminal to be used for determining whether to communicate in the non-communication period;
transmitting information on the threshold power level to the negotiated base station; and
communicating with the negotiated base station during the non-communication period, if a power level of the wireless terminal in a start time of the non-communication period is less than the threshold power level.

11. The method of claim 10, wherein determining the threshold power level comprises determining the threshold power level based on an interference level for a communication with at least one of the base stations, except for the negotiated base station.

12. The method of claim 10, wherein information on the power level of the wireless terminal is transmitted to the negotiated base station.

13. The method of claim 10, wherein the non-communication period is periodically repeated according to a non-communication period cycle.

14. The method of claim 10, further comprising reducing a level of interference between wireless signals communicated between the negotiated base station and the wireless terminal, if the interference level is greater than an interference threshold.

15. The method of claim 14, wherein communicating with the negotiated base station comprises communicating with the negotiated base station in the non-communication period, if the reduced level of the interference is less than the interference threshold.

16. The method of claim 15, wherein communicating with the negotiated base station further comprises transmitting, to the negotiated base station, power information including a power level of at least one associated transmission signal at which a reduced level of interference is less than the interference threshold, among power levels of transmission signals transmitted from multiple transceivers of the wireless terminal to base stations of the multiple wireless communication systems.

17. A base station, comprising:
a transceiver configured to communicate with a wireless terminal; and
a controller configured to negotiate with the wireless terminal, to set a non-communication period, to receive, from the wireless terminal, information on a threshold power level of the wireless terminal to be used for determining whether to communicate in the non-communication period, to detect a power level of the wireless terminal in a start time of the non-communication period, and to communicate with the wireless terminal during the non-communication period, if the detected power level is less than the threshold power level.

18. The base station of claim 17, wherein the threshold power level is determined based on an interference level for a communication with at least one of other base stations by the wireless terminal.

19. A method for communicating with a wireless terminal by a base station, the method comprising:
negotiating with the wireless terminal to set a non-communication period;
receiving, from the wireless terminal, information on a threshold power level of the wireless terminal to be used for determining whether to communicate in the non-communication period;
detecting a power level of the wireless terminal in a start time of the non-communication period; and
communicating with the wireless terminal during the non-communication period, if the detected power level is less than the threshold power level.

20. The method of claim 19, wherein the threshold power level is determined based on an interference level for a communication with at least one of other base stations by the wireless terminal.

* * * * *